(12) United States Patent
Skinner et al.

(10) Patent No.: US 12,114,403 B1
(45) Date of Patent: *Oct. 8, 2024

(54) CARBON NANOTUBE HEATER COMPOSITE TOOLING APPARATUS AND METHOD OF USE

(71) Applicant: Mainstream Engineering Corporation, Rockledge, FL (US)

(72) Inventors: Anna P. Skinner, Rockledge, FL (US);
Kayla S. O'Neill, Madison, WI (US);
Rachna C. Igwe, Melbourne, FL (US);
Philip Cox, Cocoa Beach, FL (US);
Justin J. Hill, Cape Canaveral, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/539,816

(22) Filed: Dec. 14, 2023

Related U.S. Application Data (63) Continuation of application No. 17/168,840, filed on Feb. 5, 2021, now Pat. No. 11,930,565.

(51) Int. Cl.
*H05B 3/14* (2006.01)
*B29C 33/02* (2006.01)
(Continued)

(52) U.S. Cl.
CPC .............. *H05B 3/145* (2013.01); *B29C 33/02* (2013.01); *B29C 33/3807* (2013.01); *H05B 3/34* (2013.01);
(Continued)

(58) Field of Classification Search
CPC ...... H05B 3/145; H05B 3/34; H05B 2214/04; H05B 2203/005; H05B 2203/011; H05B 2203/013; B29C 33/3807; B29C 33/02
(Continued)

(56) References Cited

U.S. PATENT DOCUMENTS

| 4,032,752 A | * | 6/1977 | Ohmura | F01N 3/2013 |
| | | | | 252/514 |
| 4,433,115 A | * | 2/1984 | Varma | C08L 79/085 |
| | | | | 428/920 |

(Continued)

*Primary Examiner* — Eric S Stapleton
(74) *Attorney, Agent, or Firm* — Michael W. O'Neill, Esq.

(57) ABSTRACT

The present invention is an apparatus for curing composites out-of-autoclave and out-of-oven. The apparatus is a multi-layered composite tool for shaping and curing composites. It also contains a sealant layer and composite resistive heating element on the tool's surface. This heating element provides heat to the composites during cure while binding it to the other layers, eliminating the need for external heat from autoclave and oven sources. A ceramic layer is applied to the top surface of the resistive heater for electrical insulation, heater protection and to provide a smooth surface for finish for the composite components being processed with the invention. A method for using the invention is also described. Finally, one embodiment of the invention is presented where a negative composite tool is created to apply additional pressure to the composite component during curing. This additional pressure enables the current invention to more closely mimic autoclave composite processing.

6 Claims, 6 Drawing Sheets

(51) Int. Cl.
 *B29C 33/38* (2006.01)
 *H05B 3/34* (2006.01)
(52) U.S. Cl.
 CPC .. *H05B 2203/005* (2013.01); *H05B 2203/011* (2013.01); *H05B 2203/013* (2013.01); *H05B 2214/04* (2013.01)
(58) Field of Classification Search
 USPC ....................................................... 219/553
 See application file for complete search history.

(56) References Cited

U.S. PATENT DOCUMENTS

| | | | | | |
|---|---|---|---|---|---|
| 4,540,479 | A | * | 9/1985 | Sakurai | G01N 27/4077 228/124.1 |
| 4,696,711 | A | * | 9/1987 | Greszczuk | B32B 38/10 156/193 |
| 4,874,923 | A | * | 10/1989 | Hatanaka | F23Q 7/001 361/266 |
| 4,929,813 | A | * | 5/1990 | Masaka | F23Q 7/001 219/541 |
| 4,942,013 | A | * | 7/1990 | Palmer | B29C 43/3642 264/511 |
| 5,173,367 | A | * | 12/1992 | Liimatta | C08L 83/16 524/439 |
| 5,994,661 | A | * | 11/1999 | Schafer | H01J 17/22 219/121.36 |
| 6,054,692 | A | * | 4/2000 | Hitomi | H05B 3/50 219/544 |
| 6,094,334 | A | * | 7/2000 | Bedi | H01L 21/6833 361/115 |
| 7,199,336 | B2 | * | 4/2007 | Wu | H05B 3/50 219/553 |
| 7,235,736 | B1 | * | 6/2007 | Buller | H01L 31/055 136/246 |
| 7,442,414 | B2 | * | 10/2008 | Ren | B82Y 30/00 427/249.1 |
| 7,611,628 | B1 | * | 11/2009 | Hinds, III | A61N 1/0428 977/746 |
| 7,667,166 | B2 | * | 2/2010 | Zeyen | F24H 3/0447 392/502 |
| 7,683,296 | B2 | * | 3/2010 | Brady | E21B 36/04 392/301 |
| 7,985,919 | B1 | * | 7/2011 | Roscheisen | H02S 40/36 136/246 |
| 8,053,229 | B2 | * | 11/2011 | Liu | B82Y 30/00 219/520 |
| 8,581,158 | B2 | * | 11/2013 | Heintz | C09D 151/003 428/688 |
| 8,669,325 | B1 | | 3/2014 | Hyman | B44F 1/00 524/106 |
| 8,791,395 | B2 | * | 7/2014 | Chang | H05B 3/34 977/843 |
| 8,921,473 | B1 | | 12/2014 | Hyman | C08K 3/04 524/495 |
| 9,409,780 | B2 | * | 8/2016 | Hart | C01B 32/162 |
| 9,586,699 | B1 | * | 3/2017 | Vail, III | G01M 11/083 |
| 9,625,361 | B1 | * | 4/2017 | Vail, III | G01N 3/08 |
| 9,720,299 | B1 | * | 8/2017 | Timmerman | G02F 1/1525 |
| 10,059,595 | B1 | * | 8/2018 | Farbstein | B29C 43/56 |
| 10,350,837 | B2 | * | 7/2019 | Wardle | C08J 7/044 |
| 10,500,798 | B2 | * | 12/2019 | Gam | B29C 70/446 |
| 10,717,051 | B2 | * | 7/2020 | Datta | B01D 71/0212 |
| 10,717,844 | B2 | * | 7/2020 | Lima | B32B 9/007 |
| 10,941,500 | B1 | | 3/2021 | Myrick | C25D 5/10 |
| 11,031,657 | B2 | * | 6/2021 | Wardle | H01M 50/434 |
| 11,103,878 | B2 | * | 8/2021 | O'Connor | C01B 32/172 |
| 11,302,685 | B2 | * | 4/2022 | Wang | H01L 21/02126 |
| 11,401,436 | B2 | * | 8/2022 | Samad | B05D 1/06 |
| 11,421,090 | B2 | * | 8/2022 | Chazot | C08J 5/24 |
| 11,434,581 | B2 | * | 9/2022 | Schauer | C01B 32/17 |
| 11,930,565 | B1 | * | 3/2024 | Skinner | B29C 33/02 |
| 2002/0155232 | A1 | * | 10/2002 | DeLay | B32B 1/00 428/34.1 |
| 2003/0152766 | A1 | * | 8/2003 | Vargo | B32B 7/12 428/343 |
| 2004/0149733 | A1 | * | 8/2004 | Abbott | H05B 3/58 219/535 |
| 2004/0164665 | A1 | * | 8/2004 | Sasaki | H01J 29/04 313/495 |
| 2004/0188418 | A1 | * | 9/2004 | Aisenbrey | B29C 45/0013 219/535 |
| 2004/0223309 | A1 | * | 11/2004 | Haemer | G01R 1/07314 361/767 |
| 2005/0069701 | A1 | * | 3/2005 | Watanabe | B82Y 30/00 428/364 |
| 2005/0083635 | A1 | * | 4/2005 | Ooma | H01G 4/33 361/305 |
| 2005/0118403 | A1 | * | 6/2005 | Anazawa | H01H 1/027 428/209 |
| 2005/0225128 | A1 | * | 10/2005 | Diemer | B60R 21/01532 297/180.12 |
| 2006/0087248 | A1 | * | 4/2006 | Konishi | H01J 31/127 315/169.3 |
| 2006/0121185 | A1 | * | 6/2006 | Xu | C03C 17/006 427/163.1 |
| 2006/0170008 | A1 | * | 8/2006 | Konishi | H01J 29/085 257/236 |
| 2006/0186110 | A1 | * | 8/2006 | Campello | H05B 3/145 219/444.1 |
| 2007/0092595 | A1 | * | 4/2007 | Yoshino | B29C 45/73 425/547 |
| 2007/0159057 | A1 | * | 7/2007 | Kaneko | H01J 29/864 313/292 |
| 2007/0159075 | A1 | * | 7/2007 | Satou | H01J 29/085 313/506 |
| 2007/0206714 | A1 | * | 9/2007 | Conceicao | G21B 1/23 376/100 |
| 2007/0215195 | A1 | * | 9/2007 | Buller | H01L 31/035281 257/E31.038 |
| 2007/0215197 | A1 | * | 9/2007 | Buller | H01L 31/022433 257/E31.038 |
| 2007/0285843 | A1 | * | 12/2007 | Tran | G11C 13/025 360/245.9 |
| 2008/0029152 | A1 | * | 2/2008 | Milshtein | H01L 31/0465 257/E27.125 |
| 2008/0047599 | A1 | * | 2/2008 | Buller | H01L 31/0547 257/E27.125 |
| 2008/0210684 | A1 | * | 9/2008 | Kukino | H05B 3/265 219/553 |
| 2008/0242785 | A1 | * | 10/2008 | Ma | C08K 9/02 428/34.1 |
| 2008/0264472 | A1 | * | 10/2008 | Cumpston | H01L 31/02008 257/E31.038 |
| 2008/0264473 | A1 | * | 10/2008 | Cumpston | H01L 31/046 257/E27.125 |
| 2008/0302418 | A1 | * | 12/2008 | Buller | H01L 31/035281 136/265 |
| 2009/0014055 | A1 | * | 1/2009 | Beck | H01L 31/055 136/246 |
| 2009/0096346 | A1 | * | 4/2009 | Liu | H05B 3/54 313/325 |
| 2009/0096348 | A1 | * | 4/2009 | Liu | H05B 3/34 445/35 |
| 2009/0124705 | A1 | * | 5/2009 | Meyer | B82Y 30/00 423/445 B |
| 2009/0198117 | A1 | * | 8/2009 | Cooper | A61B 5/6846 600/347 |
| 2009/0278556 | A1 | * | 11/2009 | Man | G01N 27/4146 324/693 |
| 2009/0314765 | A1 | * | 12/2009 | Feng | H05B 3/145 219/520 |
| 2010/0000669 | A1 | * | 1/2010 | Feng | H05B 3/145 29/611 |
| 2010/0006557 | A1 | * | 1/2010 | Maruyama | B32B 15/043 428/34.4 |
| 2010/0122980 | A1 | * | 5/2010 | Wang | H05B 3/145 219/553 |

(56) References Cited

U.S. PATENT DOCUMENTS

| | | | | |
|---|---|---|---|---|
| 2010/0126981 A1* | 5/2010 | Heintz | C08F 291/00 | 977/734 |
| 2010/0132765 A1* | 6/2010 | Cumpston | H01L 31/035281 | 136/255 |
| 2010/0136224 A1* | 6/2010 | Britz | C09D 7/61 | 977/932 |
| 2010/0147367 A1* | 6/2010 | Cumpston | H01L 31/035281 | 136/255 |
| 2010/0184346 A1* | 7/2010 | Qi | C09D 127/12 | 428/323 |
| 2010/0213790 A1* | 8/2010 | Chen | H10N 30/072 | 310/307 |
| 2010/0224620 A1* | 9/2010 | Shibata | H01L 21/67103 | 219/460.1 |
| 2010/0243637 A1* | 9/2010 | Liu | H05B 3/145 | 219/520 |
| 2010/0300532 A1* | 12/2010 | Cumpston | H01L 31/0322 | 156/322 |
| 2010/0321758 A1* | 12/2010 | Bugno | B60R 1/088 | 359/267 |
| 2011/0005667 A1* | 1/2011 | Allison | B25B 11/005 | 156/247 |
| 2011/0024410 A1* | 2/2011 | Liu | H05B 3/265 | 219/553 |
| 2011/0056928 A1* | 3/2011 | Feng | H05B 3/145 | 219/546 |
| 2011/0056929 A1* | 3/2011 | Feng | H05B 3/262 | 219/546 |
| 2011/0094217 A1* | 4/2011 | Chen | B32B 5/02 | 428/221 |
| 2011/0124483 A1* | 5/2011 | Shah | C04B 35/584 | 252/502 |
| 2011/0151232 A1* | 6/2011 | Meegan | B29C 70/48 | 428/221 |
| 2011/0188838 A1* | 8/2011 | Abbott | H05B 3/34 | 392/407 |
| 2011/0205688 A1* | 8/2011 | Ray | H01G 11/86 | 977/750 |
| 2011/0285640 A1* | 11/2011 | Park | G02F 1/13338 | 349/122 |
| 2012/0006809 A1* | 1/2012 | Kobyakov | C04B 35/653 | 264/332 |
| 2012/0058296 A1* | 3/2012 | Shah | C23C 16/26 | 977/890 |
| 2012/0058352 A1* | 3/2012 | Shah | B82Y 40/00 | 977/734 |
| 2012/0082806 A1* | 4/2012 | Kissell | C09D 7/61 | 428/221 |
| 2012/0085695 A1* | 4/2012 | Saxena | B01D 39/2082 | 977/902 |
| 2012/0098419 A1* | 4/2012 | Chiba | H10K 50/81 | 75/343 |
| 2012/0161112 A1* | 6/2012 | Lowenthal | H01L 31/0475 | 257/E51.024 |
| 2012/0161113 A1* | 6/2012 | Lowenthal | H10K 59/90 | 257/E51.024 |
| 2012/0161195 A1* | 6/2012 | Lowenthal | H01L 31/035236 | 257/E33.059 |
| 2012/0161196 A1* | 6/2012 | Lowenthal | F21V 3/06 | 257/E33.059 |
| 2012/0161338 A1* | 6/2012 | Lowenthal | H10K 59/805 | 257/E23.116 |
| 2012/0164796 A1* | 6/2012 | Lowenthal | H01L 33/56 | 252/521.5 |
| 2012/0164797 A1* | 6/2012 | Lowenthal | H10K 50/80 | 257/E21.502 |
| 2012/0172953 A1* | 7/2012 | Chen | B82Y 30/00 | 607/98 |
| 2012/0178248 A1* | 7/2012 | Wei | H01L 21/02444 | 438/479 |
| 2012/0207525 A1* | 8/2012 | Kim | B82Y 30/00 | 252/75 |
| 2012/0211484 A1* | 8/2012 | Zhou | H01L 21/67248 | 219/448.11 |
| 2012/0229882 A1* | 9/2012 | Fish, Jr. | G02F 1/157 | 359/267 |
| 2012/0241439 A1* | 9/2012 | Hashimoto | F01M 5/00 | 219/541 |
| 2012/0280430 A1* | 11/2012 | Jones | B29C 48/03 | 264/293 |
| 2013/0021789 A1* | 1/2013 | Dahm | B05D 3/067 | 362/249.02 |
| 2013/0075386 A1* | 3/2013 | Chang | H05B 3/22 | 977/843 |
| 2013/0087180 A1* | 4/2013 | Stark | H10N 10/13 | 136/205 |
| 2013/0170013 A1* | 7/2013 | Tonar | G02F 1/161 | 359/296 |
| 2013/0175515 A1* | 7/2013 | Ray | H01L 33/56 | 257/40 |
| 2013/0175516 A1* | 7/2013 | Ray | F21K 9/232 | 524/211 |
| 2013/0175556 A1* | 7/2013 | Ray | F21K 9/232 | 257/88 |
| 2013/0175557 A1* | 7/2013 | Ray | F21K 9/232 | 257/88 |
| 2013/0176750 A1* | 7/2013 | Ray | F21V 23/06 | 362/227 |
| 2013/0284718 A1* | 10/2013 | Feng | H05B 3/34 | 219/539 |
| 2014/0008845 A1* | 1/2014 | Huda | B29C 70/443 | 425/504 |
| 2014/0110889 A1* | 4/2014 | Wei | B82Y 30/00 | 264/479 |
| 2014/0263278 A1* | 9/2014 | Zakhidov | F24S 70/30 | 428/323 |
| 2014/0312332 A1* | 10/2014 | Lowenthal | H10K 59/87 | 257/40 |
| 2015/0099078 A1* | 4/2015 | Fish | C08L 83/00 | 428/323 |
| 2015/0125829 A1* | 5/2015 | Hyman | B44C 3/046 | 434/81 |
| 2015/0206692 A1* | 7/2015 | Liu | H01J 1/312 | 257/10 |
| 2015/0206693 A1* | 7/2015 | Liu | H01J 31/12 | 257/10 |
| 2015/0264747 A1* | 9/2015 | Abbott | F24D 13/02 | 392/407 |
| 2015/0276194 A1* | 10/2015 | Lowenthal | F21K 9/90 | 362/231 |
| 2015/0293065 A1* | 10/2015 | Kissell | G01N 33/00 | 73/865.8 |
| 2015/0344156 A1* | 12/2015 | Vail, III | G01R 31/008 | 701/32.8 |
| 2015/0349206 A1* | 12/2015 | Lowenthal | H10K 50/80 | 257/459 |
| 2015/0366005 A1* | 12/2015 | Janas | H05B 3/34 | 219/541 |
| 2015/0380608 A1* | 12/2015 | Lowenthal | H10K 50/80 | 257/40 |
| 2016/0064597 A1* | 3/2016 | Wei | H01L 21/0254 | 438/478 |
| 2016/0066419 A1* | 3/2016 | Kamei | H05K 1/0393 | 174/254 |
| 2016/0137533 A1* | 5/2016 | Na | C23C 16/448 | 205/759 |
| 2016/0138814 A1* | 5/2016 | Yang | H05B 3/145 | 219/494 |
| 2016/0282990 A1* | 9/2016 | Kimura | G06F 3/0446 | |
| 2017/0063132 A1* | 3/2017 | Sultenfuss | H02J 50/70 | |
| 2017/0113951 A1* | 4/2017 | Su | C02F 1/469 | |
| 2017/0118799 A1* | 4/2017 | Antoinette | H05B 3/145 | |
| 2017/0158935 A1* | 6/2017 | Koh | C01B 32/174 | |
| 2017/0232641 A1* | 8/2017 | Humfeld | B29C 33/02 | 264/40.1 |
| 2017/0282411 A1* | 10/2017 | Aitken | B29C 33/00 | |
| 2017/0316713 A1* | 11/2017 | Hyman | B44C 3/046 | |
| 2017/0334725 A1* | 11/2017 | Noyes | C01B 32/162 | |

(56) References Cited

U.S. PATENT DOCUMENTS

| | | | |
|---|---|---|---|
| 2017/0358637 A1* | 12/2017 | Lee | H10K 59/1213 |
| 2018/0023793 A1* | 1/2018 | Lowenthal | H01L 33/486 |
| | | | 362/296.09 |
| 2018/0036969 A1* | 2/2018 | Gam | B29C 33/505 |
| 2018/0053911 A1* | 2/2018 | Yoshida | H10K 50/813 |
| 2018/0066875 A1* | 3/2018 | Ihnfeldt | H10N 15/20 |
| 2018/0103694 A1* | 4/2018 | Fortenbacher | A41D 13/0051 |
| 2019/0001631 A1* | 1/2019 | Hirakata | B32B 27/288 |
| 2019/0016640 A1* | 1/2019 | Garcia | F02K 9/346 |
| 2019/0039350 A1* | 2/2019 | Hu | B32B 27/32 |
| 2020/0188952 A1* | 6/2020 | Uwais | A61L 27/303 |
| 2020/0321427 A1* | 10/2020 | Park | H10K 59/1315 |
| 2020/0323043 A1* | 10/2020 | Fortenbacher | B32B 15/082 |
| 2021/0159144 A1* | 5/2021 | Lin | C01B 32/158 |

* cited by examiner

CARBON NANOTUBE HEATER COMPOSITE TOOLING APPARATUS AND METHOD OF USE

CROSS-REFERENCE TO RELATED APPLICATIONS

This application is a continuation of U.S. patent application Ser. No. 17/168,840, filed Feb. 5, 2021, now pending, and is incorporated by reference herein in its entirety.

STATEMENT REGARDING FEDERALLY SPONSORED RESEARCH OR DEVELOPMENT

This invention was made with government support under N68335-19-C-0081 and N68335-20-C-0285 awarded by NAVAIR. The government has certain rights in the invention.

BACKGROUND

The present invention is an apparatus and method of manufacturing a multilayer hierarchical tooling for the curing of a range of fiber and non-fiber reinforced polymeric composites. This is achieved in the present embodiment for both out-of-autoclave (OOA) and out-of-oven (OOO) curing utilizing a carbon nanotube (CNT) based surface heater modified tooling. Particularly, the present invention is concerned with overcoming limitations of both autoclave- and oven-cured composite manufacturing. In the prior art, issues include long composite curing times, high equipment costs, inefficient vacuum and backfilling gas utilization, inefficient heating process applied to the full environment, and high energy consumption requirements. The invention includes composite tooling which includes integrated composite heater layers such that composite prepreg laminate layers can be laid therein. The composite or prepreg layers can then be heated directly and cured by the heat supplied from the CNT heater integrated into the tooling. Accordingly, heat is applied only where it is needed and directly to the composite structure that is being cured. This eliminates the need to place the entire composite structure and often bulky tooling into an oven or autoclave to initiate the curing cycle. The invention thus eliminates the need for the large capital cost of the oven or autoclave as well as limiting the operating energy required, reducing excess heat loss to the environment, and minimizing the energy costs associated with gas pumping losses (applying pressure and vacuum cycles) required to cure composites.

Autoclave manufacturing is the industry standard for the curing of polymeric composites. It is a commonly used approach in the aerospace, marine, and high-performance sporting goods industries because of its ability to produce cured composites with exceptional mechanical properties. These composites structures are typically made by stacking pre-impregnated (prepreg) composite plies or layers, placing the entire structure and the tooling in a vacuum bag, and curing the assembly in a pressurized oven, also known as an autoclave. The autoclave can typically apply pressures up to 300 psi at temperatures up to 500° C. Because of the combination of heat and pressure, the final composite can be fully cured with a low void content, high fiber-volume fraction and strong interlaminar shear strength (ILSS), resulting in a mechanically robust finished component. While autoclave curing delivers superior strength components, it comes at a high price. Not only are the autoclave capital equipment costs high, especially for large structures, its operational costs are also high and require a great deal of material resources and energy resources, in addition to a high level of latent heating losses to the environment as both the large tooling and composite structure are heated. For instance, first, the autoclave must be pressurized with inert gas, then the autoclave and contents are heated to the operating or curing temperature. The gas provides heat convectively-diffusively to the composite and tooling, resulting in an indirect and inefficient method of heat transfer to the sample. The elevated temperature, for the composite and tooling must be maintained for multiple hours while the composite resin cures, increasing the overall energy demand. Since autoclaves contain a fixed volume of gas, the cost to produce the heat remains fixed regardless of the size of composite part being cured as well as requiring the heating of the entire tooling. It is estimated that curing a small section of the Boeing 787 carbon fiber/epoxy fuselage requires 350 GJ of energy and produces 80 tons of carbon dioxide. As the number of applications switching to composite structures grows, the need for a lower-cost, more energy efficient manufacturing method with a shorter cycle time while producing the same high quality composites becomes more critical. This requires the use of approaches that avoid the use of large and often inefficient ovens and autoclaves to apply the heat. The present invention relates to processing of both large and small scale composite components which are conventionally cured in an autoclave. These components include airplane wings, wind turbine blades, sailboat masts, as well as other large and smaller composite parts identifiable to one of ordinary skill in the art. The invention can also be formed as a conformable heater for other heating products in the industrial and commercial sector where rapid and lightweight heating has a market advantage.

The present invention is unique due to the use of ceramic and other high temperature stability materials to fabricate the multilayer tooling, thus allowing the tool to operate at temperatures up to 900° C. In addition, since only the active heater layer is heated in operation and the materials' thermal characteristics are tuned to limit heat loss to the environment during composite curing, this reduces operating energy consumption during composite processing. The multilayer tooling incorporates a substrate made from electrically insulating, high temperature materials with low inherent thermal conductivity values, sealing and base layers with low controlled surface porosity, robust mechanical and thermal characteristics, and a composite CNT-based heater layer with targeted electrical characteristics and current collector bus bars or strips to provide local heating of the tool surface.

Koerwien, T. (U.S. Pat. No. 8,357,325 B2) and Glancy (U.S. Pat. No. 8,308,889 B2) provide tooling or molds with the direct integration of heaters. However, each of these approaches suffers from one or more of the following disadvantages. Koerwien's approach integrates a carbon-based heater, however this heater is in the form of an addition of a continuous or discrete woven or braided mesh layer which is laid up into the mold with the prepreg layers. This discrete layer provides a rough layer which can be enveloped or impregnated with resin and subsequently cured to form the heater. It must also be laid up into the mold and thus can reduce the potential feature size, if the thickness is not corrected for adequately. Moreover, since it is a discrete separate layer it can become displaced, or misaligned during layup making repeated use of the mold more difficult. The prior art approach also likely requires the use of additional thermal insulation layers, making the mold layup more complex. Glancy uses a CNT based carbon material to fabricate the heater layer; however, the CNT is incorporated into a polymeric or resin component. This provides a major limitation, in both Koerwien's and Glancy's designs, as the resin material selections used in these heaters leads to restrictions on the operating temperature range, limiting the applicability of the tooling and preventing the effective use with many of the current high-performance composite prepreg materials. Furthermore, high loadings of carbon fiber materials can lead to a degradation of the layer structural properties as well as the potential for aggregation, which can produce uneven heating and potential failure. These materials lack sufficient thermal insulation properties when they are formed into integrated components leading to increased energy loss. This does not allow for the significant energy savings associated with the use of ceramic-based heaters in our invention and often necessitates the need for additional insulation during use. Furthermore, in these approaches there is no mechanism to apply additional pressure beyond that of the vacuum bagging pump in order to provide the equivalent cure to existing prepreg materials designed for use in pressurized autoclaves.

For the foregoing reasons, there is a need for alternative composite heaters and tooling that are more efficient and have a wider temperature operating range to maximize the applicability of the device to all prepreg resin materials.

SUMMARY

The disclosed invention is an integrated composite, multilayer, tooling or mold structure with an integrated reusable heater layer for curing fiber- and non-fiber-reinforced polymer matrix composites without the need for an external heating mechanism such as an oven or autoclave, thus allowing for rapid composite part manufacturing. In the present invention, the composite prepreg material is laid-up on a ceramic mold tooling with integrated conformally applied resistive heater and release layers. This allows for simultaneous shaping and heating within a single piece of equipment. The present invention is composed of a high temperature, machinable, and thermally insulating mold material to provide shape, insulation and structure to the mold, an integrated composite carbon nanotube-based resistive heater layer, integrated electrical contacts for the application of a controlled and well distributed heating current to the resistive layer, and a protective, electrically insulating topcoat or release layer, allowing direct composite curing on the surface of the tooling. The tool plate is the structural element of the invention and provides the final shape for the composite component that will be cured. It is thermally and electrically insulating to allow for a standalone tool system that reduces energy requirements during composite curing. The insulating tool plate allows electricity supplied to the system to be contained to the CNT heater and the bulk of the heat generated to be directed toward the composite component. The surface of the tool plate has high surface smoothness and low porosity to serve as an adequate substrate for CNT deposition. This can be achieved by the use of a low porosity base material or precoating or presealing with a ceramic or similar high temperature sealant material to form the base layer. The CNT layer is applied directly to the surface of the sealed tool plate, becoming an integral part of the reusable tooling, and serving as a resistive heating element. The CNT layer can be applied through a range of coating methods, known to one of ordinary skill, directly to the tooling's surface. At least two electrical contacts are applied at either end of the CNT resistive heater layer to supply DC or AC current to the CNTs and induce joule heating of the resistive layer. The CNT layer can be applied alone or more preferably mixed with a high temperature binder to improve stability of the layer. An electrically insulating ceramic layer is applied to the CNT resistive heater layer to protect the CNT resistive heater from mechanical damage, provide electrically insulating properties, and provide an efficient release layer for the cured composite. Once the composite tooling is fabricated and the ceramic binders are fully cured and annealed, it can be used as a multiuse surface or tooling for laying up prepreg composites to a desired thickness. The prepreg layup is vacuum bagged, and an inverse tooling mold may be used to apply pressure (with or without a heater of its own), which can still be vacuum bagged, and DC or AC power is used to heat the CNT heater, curing the composite in situ. A thermocouple or thermocouple array may be used to monitor the temperature and provide feedback for the electrical inputs to achieve the desired temperature and/or temperature program prepreg material. This invention enables manufacturers to save operating energy, through avoiding the use of autoclaves and ovens, while allowing the reuse of the tooling multiple times with reproducible performance to create identical composite components. Overall the fully integrated tooling provides a robust tool and integrated heater layer, thus maximizing the tooling life, minimizing the overall maintenance requirements, and saving composite manufacturing time and costs.

An object of this invention is the curing of composites to the same quality as conventional autoclave and oven cured composites.

A further object of this invention is the curing of composites at temperatures between 25° C. and 900° C.

Another further object of this invention is the reduction of the energy requirements for composite curing compared to conventional oven and autoclave processes.

A still further object of this invention is the rapid manufacturing of identical composite components through expedited curing times.

The present invention improves on the known variations of autoclave and oven composite processing by rapidly supplying heat to the part directly via conduction rather than convection-conduction-diffusion normally required for autoclave and oven curing. This allows reduction in composite processing energy costs and time. The invention is made from inexpensive materials, providing savings in costs on fabrication of the tooling. One embodiment of the invention is the reduction of overall materials costs and the coating of complex and highly non-planar surfaces through the application of the CNT layer and top-coat to the tooling using a solution based deposition technique. Since the CNT heater element is applied via solution deposition as a thin film integrated into the mold surface, is can be applied precisely and conformally to complex mold geometries. In addition, the invention can be scaled to any size, eliminating part size limitations seen with autoclaves and ovens.

Other objects, advantages and novel features of the present invention will become apparent from the following detailed description when considered in conjunction with the accompanying drawings and non-limiting examples herein.

The present invention improves on the known variations of polymer composite curing methods by reducing energy consumption, providing faster heating and cooling, simplifying the required equipment and reducing operational and capital equipment costs. Further, the resistive heater itself can be applied in a thin and conformal layer on highly curved geometries and only needs sufficient topcoat thickness to prevent electrical conduction into the composite material being cured. The layered structure with insulating topcoat allows the heater to be reused for multiple cure cycles. The thin layers also reduce thermal expansion disparities between layers. Another improvement lies in the high temperature stability of all materials used. This allows for composite curing of high temperature materials such as bismaleimide and polyimide resin based prepregs.

BRIEF DESCRIPTION OF THE DRAWINGS

These and other features, aspects, and advantages of the present invention will become better understood with regard to the following description, appended claims, and accompanying drawings where:

DESCRIPTION

In the Summary above and the Description, and the claims below, and in the accompany drawings, reference is made to particular features (including method steps) of the invention. It is to be understood that the disclosure of the invention in this specification includes all possible combinations of such particular features. For example, where a particular aspect or embodiment of the invention, or a particular claim, that feature can also be used, to the extent possible, in combination with and/or in the context of the other particular aspects and embodiments of the invention, and in the invention generally.

The main components of the integrated composite heater-based reusable tooling include a main insulating tool plate or mold, which forms the shape of the mold for the final structure and acts as the base for the thin film heater layer, a conductive connection to provide electrical contact to the integrated thin film heater, the electrical system to provide the applied voltage or current, and the protective, electrically insulating smooth topcoat or release layer.

Figure 1A:
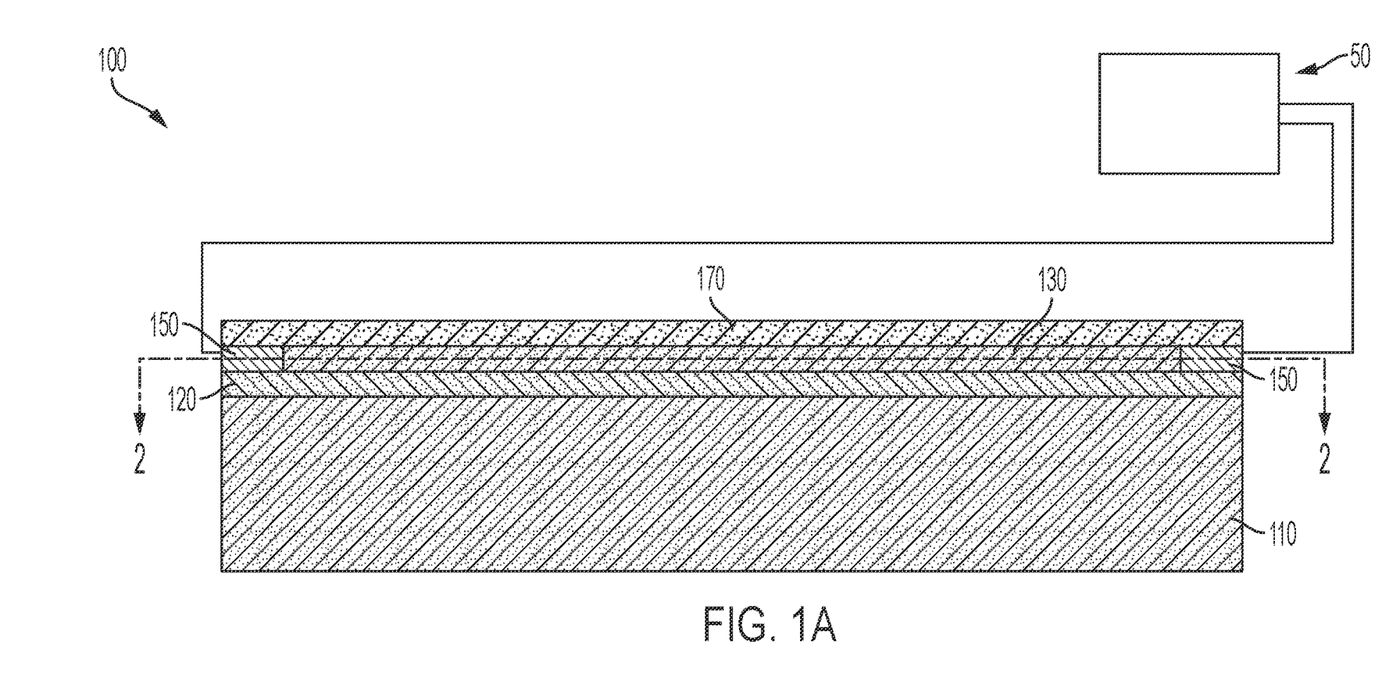
FIG. 1A is a section view of one embodiment of the composite tooling with CNT surface heating.

Now referring to FIG. 1A, a section view of the composite heater system 100 is depicted. It is electrically connected to a power supply 50 to allow the application of an electric potential and thus heating. The main tool plate 110 provides the structure and machined shape for the composites to be cured. The main tool plate 110 is fabricated from a material that is electrically and thermally insulating preferably with a thermal conductivity less than 2 W/m-K. Furthermore, it should also be easily machined or shaped to allow the fabrication of a mold with complex geometry. It should also be fabricated from a material that can be joined or bonded together in segments as the tooling and heater are scaled to larger dimensions. A range of materials include glasses and ceramic materials such as borosilicate, zirconia, silica, and other machinable ceramic and highly temperature stable, thermally insulating materials. A low porosity material is preferred. One such material is calcium silicate, which is available in a range of porosities and densities.

Still referring to FIG. 1A, on top of the main tool plate 110, a sealant layer 120 is directly applied to both close off surface porosity as well as provide a smooth base layer for the formation of the composite heater and release layers. The sealant layer 120 allows for smooth and uniform deposition of the CNT resistive heater 130 onto the tool plate 110, as these materials used for the main tool plate 110 are often porous. Further the sealant layer 120 helps ensure the final surface for the composite heater system 100 is smooth. The sealant layer 120 can be deposited via traditional coating techniques such as brush coating, spray coating, or knife coating. The material used for the sealant layer 120 is preferably a ceramic-based liquid or high temperature stability coating (>900° C. stability). The sealant layer 120 can be but is not limited to sodium silicate, potassium silicate, or alumina-based silicate paint, ceramic pottery glaze or similar. Ideally the sealant layer 120 dries or cures without cracking or bubbling into a solid at temperatures less than 1000° C. The sealant layer 120 is not limited to a single material or layer, but can also be a combination of materials or layers in order to provide the two needs of the sealant layer 120, viz., reducing porosity and providing surface smoothness.

Figure 1B:
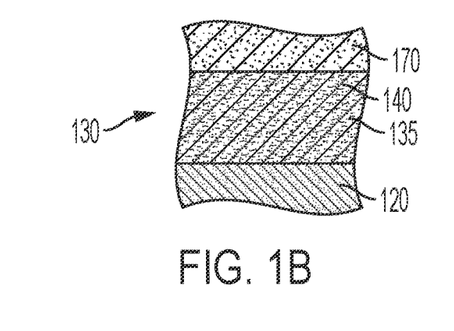
FIG. 1B is a section view of a selected segment of the layered structure of the composite tooling.

FIG. 1A and FIG. 1B show the CNT resistive heater 130 is applied directly to the sealant material 120. One embodiment of the CNT resistive heater 130 is a network of electrically connected CNTs 135 encompassed within a binder material 140, shown in FIG. 1B. Still referring to FIG. 1B, CNTs 135 can provide highly uniform resistive heaters 130 due to their nanoscale size and immense number of CNT-CNT junctions when deposited in a film. Resistive heating results from inefficient electron transfer at CNT-CNT junctions in the CNT resistive heater 130. Therefore, it is important for the CNTs to be evenly dispersed throughout the CNT heater 130 to result in uniform resistive heating. The CNTs used in the CNT resistive heater network 130 can be single-wall or multi-wall nanotubes. The resistive heater network 130 may not be limited to the use of carbon nanotubes, but alternatively, can be high-temperature stability low or high aspect ratio particles including carbon-based particles such as graphene or other conductive or semiconducting nanowires. The surface roughness of the sealant layer 120 should be minimal to create a suitable surface for CNT heater 130 deposition to allow for a uniform distribution of the CNTs 135 and even heating. Because CNTs 135 have dimensions on the nano-scale, they are sensitive to small variations in surface roughness. If the surface roughness is not minimal, depositing a uniform CNT heater layer 130 is difficult. Additionally CNT junctions may separate causing hot spots in the CNT resistive heater 130. CNTs also have very low specific heat capacities, meaning that they release heat as soon as it is generated at the CNT junctions, making them a good candidate for the resistive heater material 130. This results in fast heating rates which can save composite processing times. While the CNT layer can be used without a binder, it is beneficial to add a binding material 140 within the CNT layer 135 to improve adhesion between layers and improve heater 130 stability. The heater performance characteristics may be controlled by the ratio of binder material 140 to CNT material 135 or otherwise by the amount of CNTs deposited. The binding material 140 can be mixed into the CNT material 135 to form the CNT heater 130 and applied to the sealant layer 120. The binding material 140 can be similar to the underlying sealant layer 120 such as sodium silicate, potassium silicate, or alumina-based silicate paint.

Still referring to FIG. 1B, there are a number of available methods for performing CNT heater 130 deposition. These methods include but are not limited to airbrush spraying, ultrasonic spraying, airless spraying, electrostatic spraying, high volume-low pressure spraying, low volume-medium pressure spraying, Meyer rod coating, screen printing, knife coating, slot die coating, direct write additive manufacturing, brush painting, or roller painting. As an alternative to mixing the two CNT heater 130 components prior to deposition, the CNT material 135 and the binding material 140 may be simultaneously deposited from separate solutions via co-deposition techniques such as co-spray deposition (via including but not limited to airbrush, ultrasonic, airless, high pressure low volume, or simultaneous screen printing, knife coating, or slot die coating.

Figure 1C:
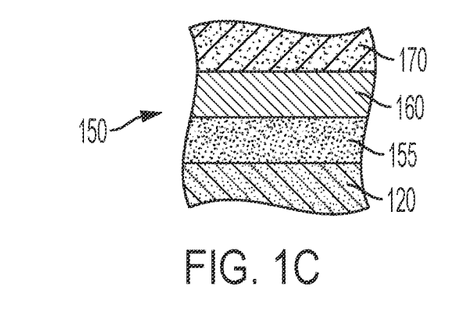
FIG. 1C is a section view of one embodiment of the electrical conductor layers.

Now referring to FIG. 1A, an electrical conductor or current collector system 150 is applied on at least two sides of and in electrical contact with the CNT heater layer 130 and power supply 50 to allow creation of an AC or DC voltage across the system. At least two electrical conductors 150 are required in the system. See FIG. 2. However, this number should be increased as the CNT heated composite tooling 100 size increases so that the voltage drop across the CNT resistive heater network 130 is controlled. The electrical conductors 150 are placed based on the geometry of the main tool plate 110 to ensure the correct amount of current is flowing through specific sections of the CNT heater 130 and the appropriate amount of heat is generated and delivered to specific sections. The electrical conductor 150 must be highly electrically conductive and can be made from nickel, graphite, copper, silver, molybdenum, or tungsten, although they are not limited to these materials. A electrical conductor 150 that does not oxidize readily at elevated temperatures in air is preferable, though an oxidizable electrical conductor 150 can be protected by the ceramic topcoat 170. Further, a conductive material 150 with a coefficient of thermal expansion similar to that of the underlying ceramic materials is beneficial. One possible embodiment of the conductive material 150 is shown in FIG. 1C. This embodiment in FIG. 1C could be a metal-ceramic paste, ink or high-temperature adhesive or otherwise composite or conductive particle loaded structure such as a high temperature conductive adhesive, epoxy or other appropriate thermoset or thermoplastic material 155 in conjunction with a solid conductor 160 such as metal foil, wire, or rod. The conductors 150 must also be conformable to complex geometry tool plate shapes 110. Another possibility for depositing the conductive material 150 is to electrodeposit a metal from a metal-salt solution into the desired area. This process will require two steps with the application of a seed layer of conductive material such as the conductive paste, conductive ink, adhesive, or epoxy 155 and the second step of electrodepositing a metal layer on the seed layer to form the solid conductor 160.

Figure 1D:
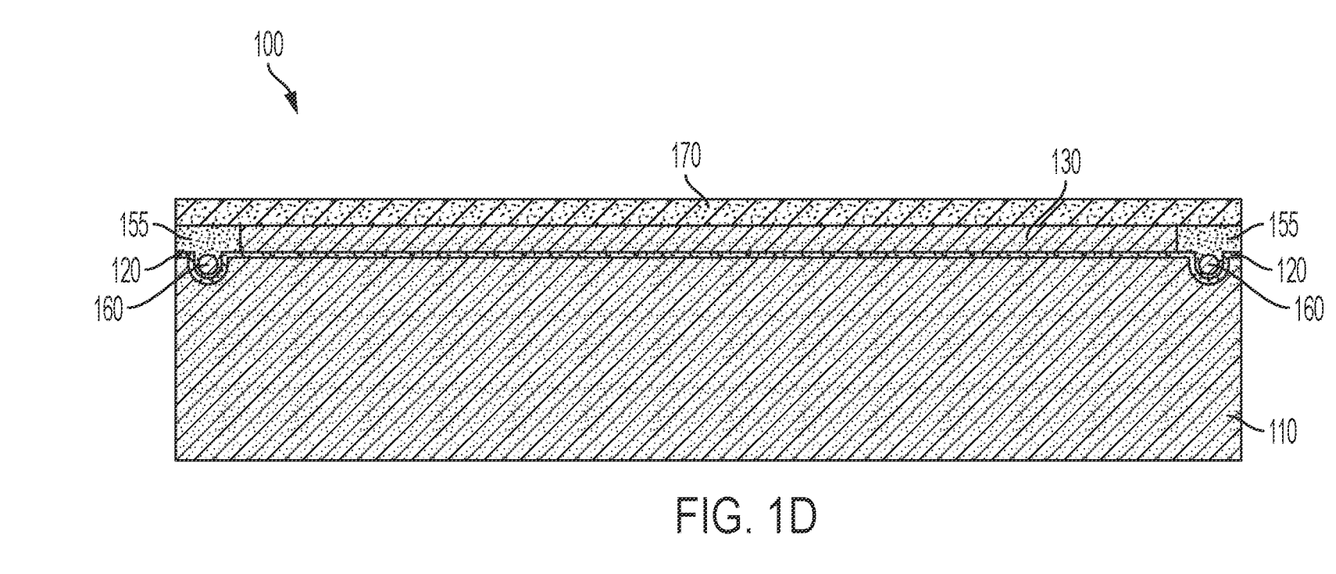
FIG. 1D is an alternate embodiment of the composite tooling with CNT surface heating.

Another variation of the conductive material is shown in FIG. 1D. In this embodiment, the main tool plate 110 is machined such that grooves are cut out for the placement of the conductors 150. The sealant layer 120 is coated on the main tool plate 110 including within the grooves. The solid conductors 160 such as metal rods or wires are placed within the groove and the conductive adhesive or epoxy 155 is placed on top of the solid conductors 160 until the groove is filled. The CNT heater layer 130 is then deposited on top of the sealant layer 120 and in contact with the electrical conductors 150.

As shown in FIG. 1A, FIG. 1B, and FIG. 1D, an electrically insulating and highly temperature stable topcoat 170 is applied on top of the CNT resistive heater 130 to electrically insulate the surface of the composite heater system 100. The topcoat 170 also protects the CNT heater 130 from environmental effects including oxidation at high temperatures and mechanical forces and provides a smooth surface finish for the processed composite components. The topcoat 170 may or may not be applied so that it covers the electrical conductors 150, depending on material compatibility and manufacturing method. The topcoat 170 is electrically insulating and has a hard, smooth surface finish. Additionally, a topcoat 170 with a coefficient of thermal expansion that is comparable to other layers of the composite heater is beneficial. For this reason, a ceramic-based material, e.g., boron nitride, is a preferred choice for the topcoat 170. Further, it is beneficial if the topcoat 170 has thermally conductive properties to improve temperature uniformity and heat distribution in the CNT heater 130. The topcoat 170 also allows for repairs and/or replacements to be made to maximize the life of the CNT heated composite tooling 100 over time. The topcoat 170 should be kept thin, from 1 micron to hundreds of microns, and more preferably within the range of 10 microns to 100 microns to allow rapid heat transfer to the composite part and reduce the thermal mass of the composite tooling 100 relative to the thermal mass of the part undergoing curing. These aspects will result in increased energy savings. Topcoat 170 material options include but are not limited to boron nitride, alumina, sodium silicate, calcium silicate, silica and woven fiberglass. Application methods for the topcoat 170 include but are not limited to airbrush spraying, ultrasonic spraying, airless spraying, electrostatic spraying, high volume-low pressure spraying, low volume, -medium pressure spraying, Meyer rod coating, screen printing, knife coating, brush painting, and roller painting. However, during application, care must be taken to not disturb the underlying CNT layer 130. For this reason, a non-contact deposition technique is preferable, such as airbrush and high volume-low pressure techniques. We have found techniques compatible with medium viscosity liquids are preferable.

Figure 2:
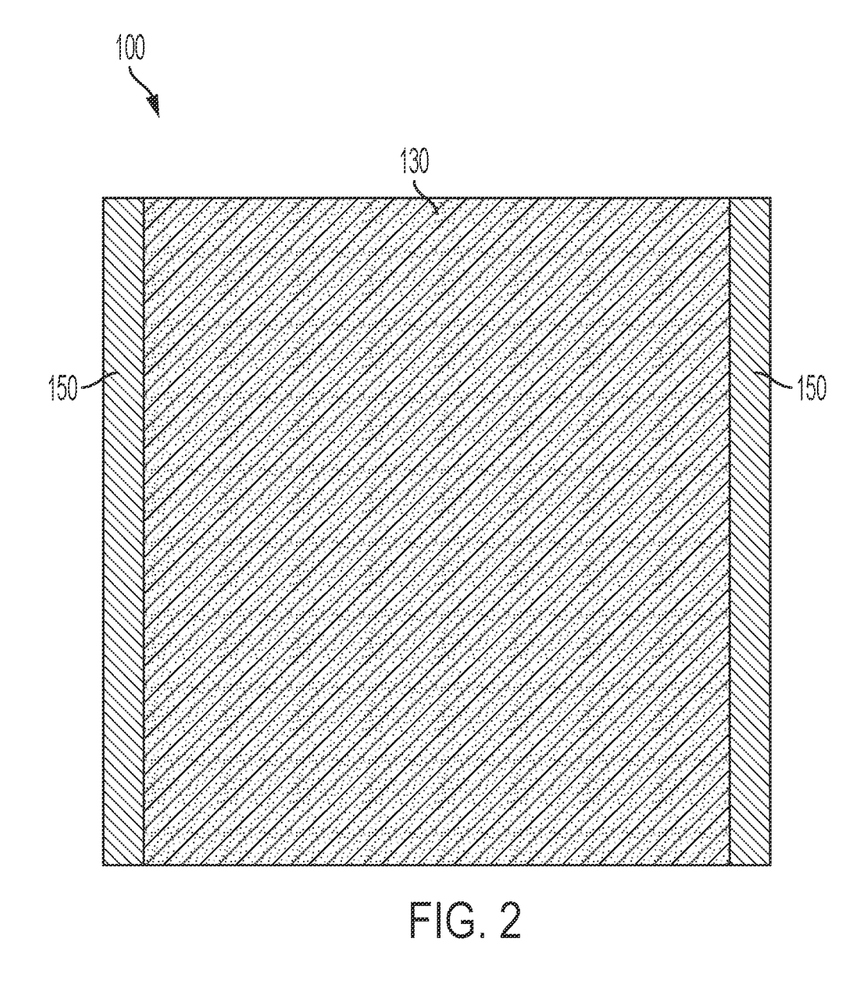
FIG. 2 is a schematic view of a randomly oriented CNT layer.

Now referring to FIG. 2, a top-down schematic representation of the CNT composite heater system 100 is depicted. The CNT resistive heater layer 130 is applied on top of the main tool plate 110 and sealant layer 120. The materials used to fabricate the CNT resistive heater 130 can be a CNT solution or suspension, or a mixture of CNTs with a binding component. The CNTs can be single-walled, double-walled or multi-walled. The CNTs can be functionalized with a side group to enhance solubility as long as enough of the $sp^2$ bonds remain to maintain good conductivity, or the CNTs can be pristine. For the instance of using a CNT suspension, the CNT loading should be between 0.1 and 10 weight percent CNTs and more preferably between 0.1 to 0.5 weight percent. Higher concentrations may be desirable for coating speed but are difficult to obtain in a stable suspension. The primary determining factor for preferred CNT concentration is stability of the solution or suspension. The solvent in the suspension can be water, n-methyl-2-pyrrolidone, ethanol, methanol, dimethylacetamide, etc. A surfactant may be necessary to suspend the CNTs in the solvent and the surfactant loading should range between 0.1 and 20 weight percent. More preferably the surfactant concentration should be between the range of 0.5 to 3 wt %. It must be sufficient to stably suspend the CNTs and maintain stability if the CNT suspension is mixed with a binder. Additional surfactant may be required in order to maintain stability of the suspension if other components such as water or a binder material are added to the already stable suspension, as the surfactant will interact with these components in addition to the CNTs. The surfactant can be a range of ionic and non-ionic surfactants such as sodium dodecylsulfonate, sodium dodecylbenzenesulfonate, Triton X-100, etc. When using a CNT suspension, after applying the CNT suspension, the main tool plate 110 and sealant layer 120 and CNT heater 130 are heated to a temperature sufficiently high to remove the solvent and cure any binding components. Additionally, the main tool plate 110 and sealant layer 120 and CNT heater 130 may be heated to remove or burn off the surfactant residue from the CNT solution if desired, though it is not critical. Additionally, heating may be required to cure the optional binding component. Heat can be applied by using an oven, heat gun, or by heating the CNT heater 130 itself after applying the electrical current conductors 150. The thickness of the CNT resistive heater 130 should preferably be between several nanometers and several hundred microns thick and preferably between 0.1 µm and 150 µm in the case of CNTs mixed with a binding material. Even more preferably in the case of CNTs mixed with a binding material, the conductive layer should be between 10 microns to 80 microns. The ideal range is dependent on if a binding material is mixed with the CNTs or not and the ratio of binding material to CNTs or conductive material. A CNT layer without a binder would only need several nanometers in thickness to form a conductive network required to produce joule heating. The CNTs used preferably have diameters between 0.4 nm and 200 nm and lengths greater than 0.1 µm. More preferably, the CNTs used should have diameters between 0.4 nm and 5 nm. Several order of magnitude difference in the diameter and length improves the aspect ratio of the particles and allows for efficient joule heating at a low particle concentration. The areal density of the CNTs should preferably range between 0.1 grams per square meter and 35 grams per square meter. More preferably, the CNT areal density should lie between 0.1 and 3 grams per square meter. The areal density should be tuned for target temperature at a given set of electrical requirements, performance, and cost. For example, to maintain an approximately 200° C. heater temperature (which would be of interest for use in a wide range of commercially available prepreg resin systems) using a 600 W power supply, CNT areal density would ideally be approximately 0.75-1 gram per square meter. A lower areal density will reduce material costs but is more susceptible to heater failure due to CNT junctions disconnecting and forming local hotspots in the CNT composite heater system 100, especially during material expansion during heating. The ceramic topcoat 170 is deposited on top of the CNT heater 130.

Figure 3A:
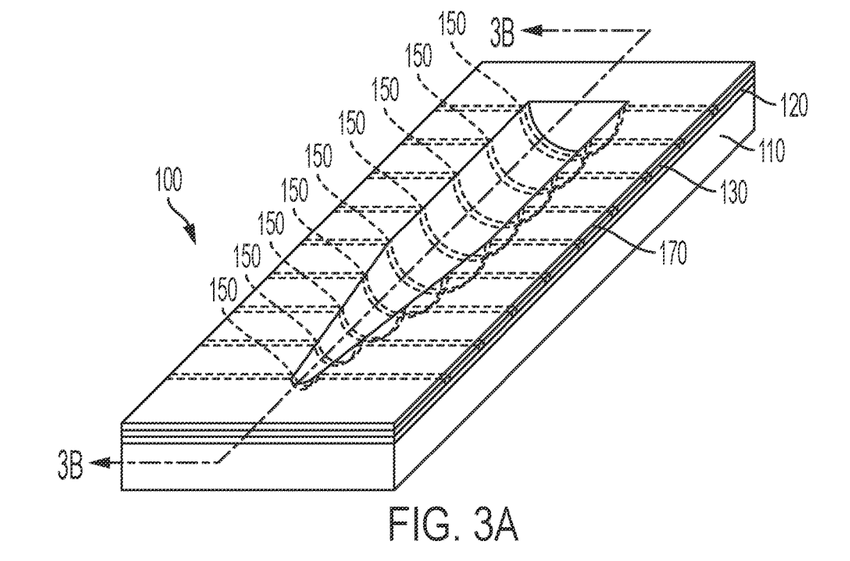
FIG. 3A is an isometric view of the composite tooling with a complex geometry for curing a non-planar component.
Figure 3B:
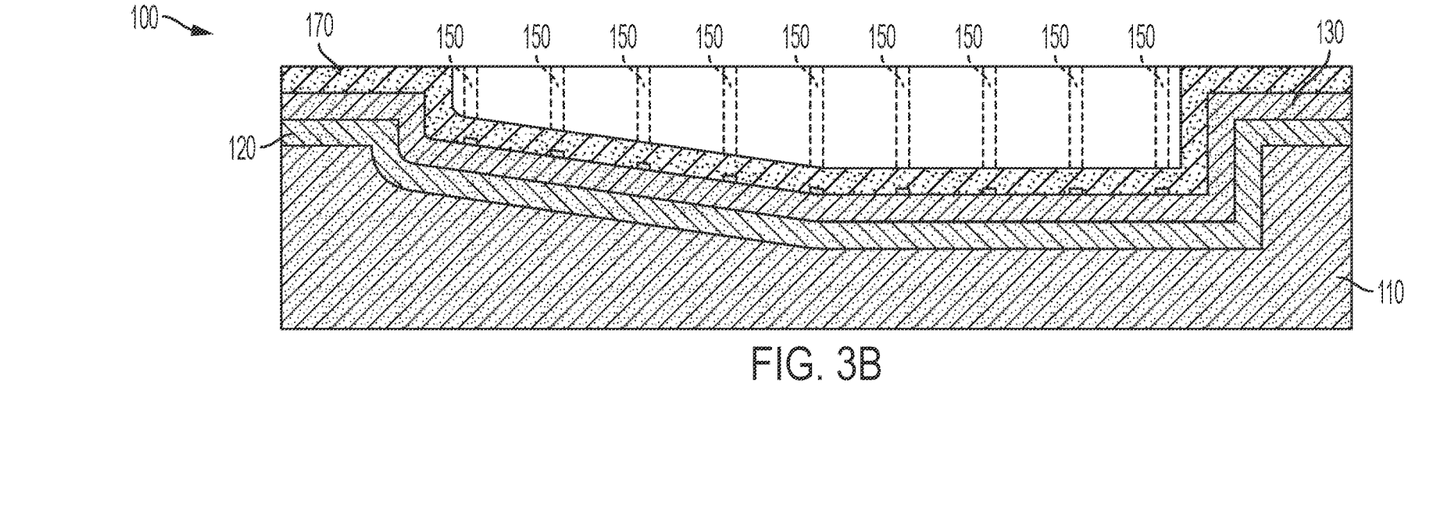
FIG. 3B is a section view of the composite tooling with a complex geometry for curing the non-planar component depicted in FIG. 3A.

Now referring to FIG. 3A and FIG. 3B, a schematic view of the CNT composite heater system 100 with a complex geometry. The specific geometry in FIG. 3A and FIG. 3B is designed for curing a complex geometry, such as a wing of an airplane or glider. Geometries are not limited, however, in shape or complexity. The main tool plate 110 is machinable and thus a wide variety of geometries are attainable. CNT composite heater system tooling 100 can be fabricated with any complex geometry provided the main tool plate 110 can be shaped appropriately and that the sealant layer 120, CNT resistive heater 130, electrical current collectors 150, and ceramic topcoat 170 can be applied uniformly over the surface to provide uniform heating properties. As geometries of the CNT composite heater system 100 become more complex, careful consideration of electrical current collectors 150 placement must be taken to ensure current runs through the CNT composite heater system 100 in an evenly distributed manner. Modeling the system may be required to perform this determination adequately.

Figure 4:
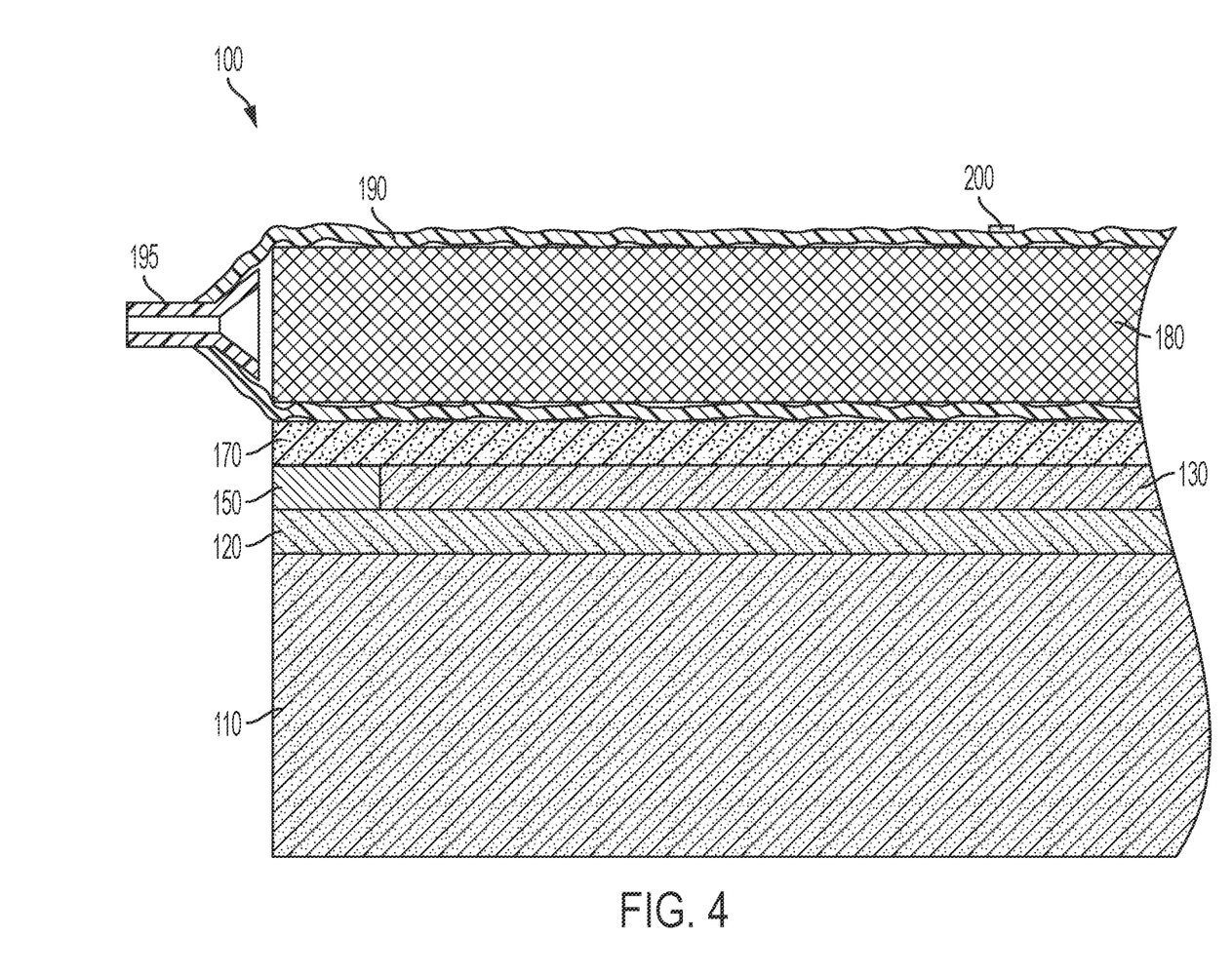
FIG. 4 is a section view of the method for composite tooling use including the composite component, vacuum bag and vacuum connector

FIG. 4 depicts a method for curing a composite component using the CNT composite heater tooling 100. The composite prepreg 180 is laid directly on top of the ceramic topcoat 170 which is applied on top of the CNT resistive heater 130. This entire layup sits on top of the sealant layer 120 and electrically and thermally insulating main tool plate 110 with at least two electrical current collectors 150 attached at either end of the CNT resistive heater 130. The composite prepreg 180 can consist of any filler and matrix material as long as it can be cured at temperatures lower than 900° C. Examples of composite prepreg 180 fibers are composite laminates composed of carbon fiber and fiberglass with resin matrix including, but not limited to thermoplastic and thermosetting resins such as bismaleimide and epoxy. The composite prepreg 180 is sealed in a vacuum bag 190 and a vacuum connector 195 is employed to pull vacuum on the system, applying 1 atm of pressure to the composite prepreg 180 during processing. A thermocouple wire or resistance temperature detector (RTD) 200 or array of thermocouples (not shown) may be placed adjacent to the composite prepreg 180 for monitoring the temperature during the curing process and allowing for feedback on temperature at a given power supplied. This would enable the user to adjust the electrical inputs to achieve the desired temperature.

Figure 5:
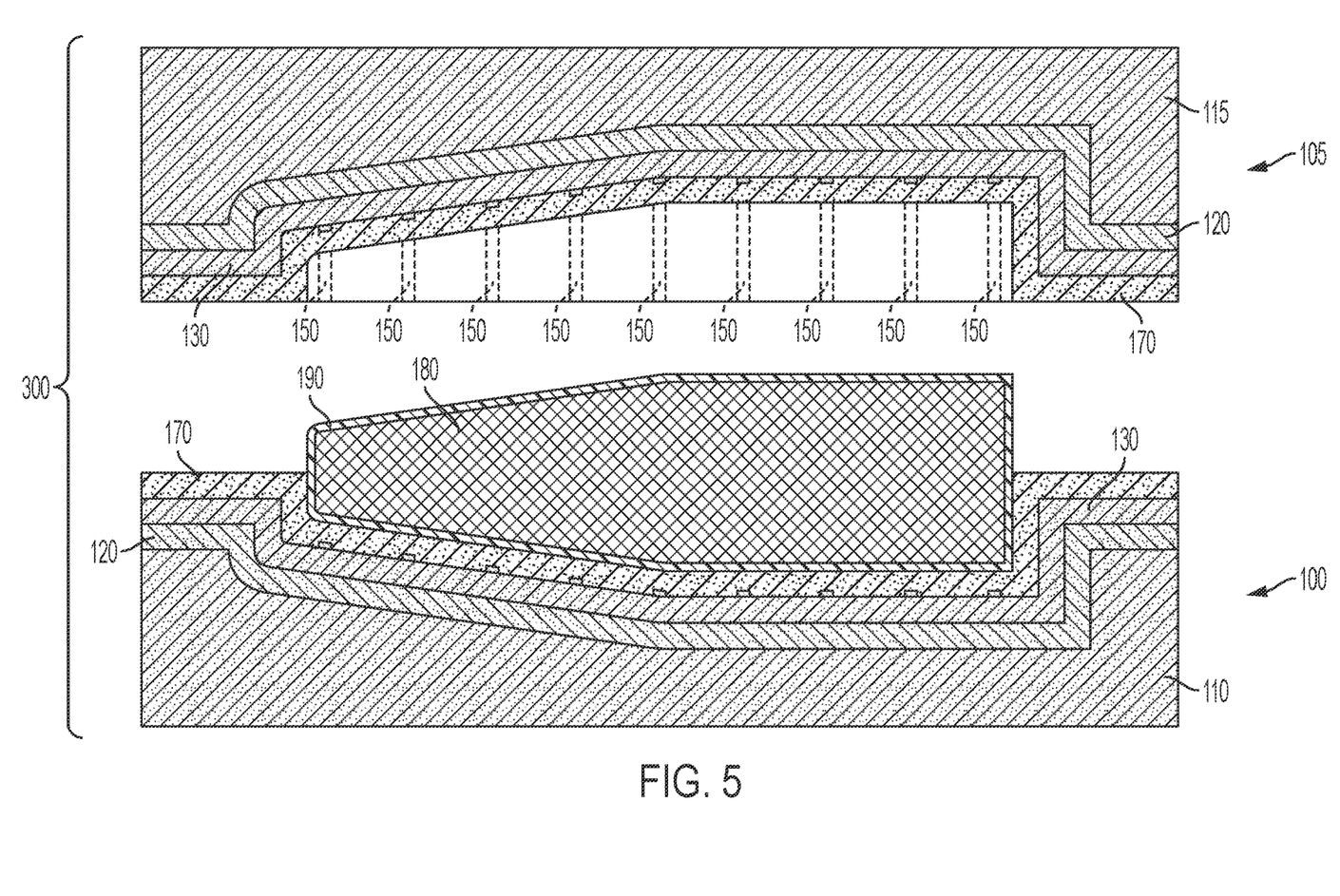
FIG. 5 is a section view of the composite tooling and negative composite tooling for applying pressure to the composite during cure.

FIG. 5 depicts another embodiment 300 of the invention that allows for an inverse mold for nonplanar geometries as well as for pressure to be applied to the composite prepreg 180 in addition to the 1 atm of pressure provided by the vacuum bag 190. A negative or inverse composite heater tooling system 105 can be created which has the same features of the composite heater tooling system 100 including the insulating substrates' main tool plate 110 and inverse tool plate 115, sealant layer 120, CNT heater 130, the ceramic topcoat 170 and the electrical conductors 150. However the inverse composite heater tooling 105 has the inverse shape of the composite heater tooling 100. Pressure can be applied to the inverse composite heater tooling 105 and the composite heater tooling 100 through a mechanical press, hydrostatic pressure, clamping forces (not shown), etc. The inverse composite heater tooling 105 also allows the composite prepreg 180 to be heated from the top surface which is useful for curing thick composite panels. It may be necessary to incorporate a high temperature, electrically insulating film (not shown) in-between the composite prepreg 180 and the inverse composite heater tooling 105 to electrically insulate the composite prepreg 180 from the electrical conductors 150 and CNT resistive heater 130 on the inverse composite heater tooling 105. While the inverse composite heater tooling may incorporate the sealant layer 120, CNT resistive heater layer 130, electrical conductors 150, and the ceramic topcoat 170, these layers may not be required, particularly in the case of thin composite prepreg parts 180. An inverse tool plate 115 may be sufficient to cure prepreg parts 180 with the desired shape under additional applied pressure.

The previously described versions of the present invention have many advantages including they are capable of curing composite prepreg materials without the use of an autoclave or oven. This is beneficial in that is significantly reduces capital equipment cost as well as operating cost, which opens up the ability of composite curing to a wider group. They can be used to apply pressure without the need for pressurizing a gas-filled chamber. They also allow greater efficiency and faster processing because electrical energy and thus heat is generated at the surface of the composite being cured, allowing for direct conductive heat transfer, in addition to faster cooling, as the thermal mass of the curing device is less than a filled autoclave.

While we have shown and described several embodiments in accordance with our invention, it should be understood that the same is susceptible to further changes and modifications without departing from the scope of our invention. Therefore, we do not want to be limited to the details shown and described herein but intend to cover all such changes and modifications as are encompassed by the scope of the appended claims.

What is claimed is:

1. A curing components out of autoclave and out of oven tool, comprising:
    a main tool plate made from a material having a thermal conductivity less than 2 W/m-K and is part of said curing components out of autoclave and out of oven tool;
    a sealant layer directly applied onto the main tool plate and closes off surface porosity and is part of said curing components out of autoclave and out of oven tool;
    a carbon nanotube resistive heater that is a network of electrically connected carbon nanotubes encompassed within a binder material and is directly applied onto the sealant layer and is part of said curing components out of autoclave and out of oven tool;
    a plurality electrical conductors made from a thermoset or thermoplastic material in conjunction with a metal conductor and connected to the heater and is part of said curing components out of autoclave and out of oven tool; and
    a ceramic topcoat is applied on the heater and the electrical conductors and is part of said curing components out of autoclave and out of oven tool.

2. The tool of claim 1, wherein the heater comprises a plurality of carbon nanotubes having an areal density between 0.1 to 3 grams per square meter.

3. The tool of claim 2, wherein the heater comprises a plurality of carbon nanotubes having an areal density between 0.75 to 1 gram per square meter.

4. The tool of claim 2, wherein the plurality of carbon nanotubes have a diameter between 0.4 to 200 nanometers and a length equal to or greater than 0.1 microns.

5. The tool of claim 3, wherein the plurality of carbon nanotubes have a diameter between 0.4 to 200 nanometers and a length equal to or greater than 0.1 microns.

6. The tool of claim 1, further comprising:
    a vacuum bag laid directly on top of the ceramic topcoat and containing a composite prepreg fibers that will become cured upon application of heat to the heaters and a vacuum being pulled.

* * * * *